(12) United States Patent
Schubert et al.

(10) Patent No.: US 7,874,590 B1
(45) Date of Patent: Jan. 25, 2011

(54) SAFETY BELT (75) Inventors: Elke Schubert, Soest (DE); Thomas Rathmann-Ramlow, Ense (DE)

(73) Assignee: Schroth Safety Products GmbH, Arnsberg (DE)

( * ) Notice: Subject to any disclaimer, the term of this patent is extended or adjusted under 35 U.S.C. 154(b) by 28 days.

(21) Appl. No.: 12/498,026

(22) Filed: Jul. 6, 2009

(51) Int. Cl.
B60R 22/36 (2006.01)
(52) U.S. Cl. ........................ 280/806; 280/807
(58) Field of Classification Search ........... 280/803, 280/806, 807
See application file for complete search history.

(56) References Cited

U.S. PATENT DOCUMENTS

| 2,394,523 | A | | 2/1946 | Pancoe | |
|---|---|---|---|---|---|
| 2,708,966 | A | | 5/1955 | Davis | |
| 6,702,056 | B2 | * | 3/2004 | Tanaka et al. | 180/269 |
| 6,729,650 | B2 | * | 5/2004 | Midorikawa et al. | 280/807 |
| 7,216,827 | B2 | * | 5/2007 | Tanaka et al. | 242/390.8 |
| 7,237,640 | B2 | * | 7/2007 | Tobata | 180/268 |
| 7,240,923 | B2 | * | 7/2007 | Tanaka et al. | 280/807 |
| 7,431,340 | B2 | * | 10/2008 | Midorikawa | 280/806 |
| 2004/0108155 | A1 | * | 6/2004 | Mori et al. | 180/268 |
| 2009/0079178 | A1 | * | 3/2009 | Odate | 280/807 |
| 2009/0289445 | A1 | * | 11/2009 | Wendt et al. | 280/806 |

FOREIGN PATENT DOCUMENTS

| DE | 34 18 185 C2 | 11/1985 |
|---|---|---|
| DE | 197 43 909 A1 | 11/1998 |

* cited by examiner

*Primary Examiner*—Toan C To
(74) *Attorney, Agent, or Firm*—Henry M. Feiereisen; Ursula B. Day (57) ABSTRACT

A safety belt includes a length adjuster for securement of one end of a belt webbing, with the length adjuster being constantly biased in a direction of retraction of the belt webbing. A locking mechanism, when rendered effective, inhibits the length adjuster from turning in a direction of protraction of the belt webbing and is operatively connected to a control unit which, when activated, applies a locking function to inhibit the belt member from being pulled out of the retractor and being retracted, thereby preventing a lengthening and shortening of the belt webbing. Operatively connected to the control unit is an actuator which is constructed to allow an occupant, upon actuation, to override the locking function and thereby render the locking mechanism ineffective to enable the occupant to adjust a length of the belt webbing.

15 Claims, 7 Drawing Sheets

SAFETY BELT

BACKGROUND OF THE INVENTION

The present invention relates, in general, to a safety belt, and in particular to a safety belt for use in an aircraft or military vehicles with limited space of movement.

The following discussion of related art is provided to assist the reader in understanding the advantages of the invention, and is not to be construed as an admission that this related art is prior art to this invention.

Safety belts for use in seats of aircrafts for example, can be designed in the form of a lap belt which, when unbuckled, automatically are pulled in. The lap belt has a belt webbing which has one end secured to a rotating length adjuster of a belt takeup and another end which has a tongue for insertion in a buckle and locking by a buckle latch in the buckle. When buckled up, the occupant is protected against potential harm in the event of turbulences. The length adjuster has a winding reel which is constantly biased in the direction of retraction of the belt webbing, and a locking mechanism to lock the length adjuster when the belt webbing has been pulled out and the length adjuster has pulled back about 25 mm of the belt webbing into the belt takeup. The belt takeup is locked but still pulls in any slack beyond 25 mm. This causes discomfort for the occupant and gives the occupant the feeling of being "chocked".

In automatic belts, a spring-biased length adjuster is provided on one end of the belt webbings and, when installed in an automobile, reacts and locks in the event of a sudden slow down of the vehicle (vehicle-sensitive), or when used in aviation, reacts to a belt acceleration (belt-sensitive) to lock the length adjuster and thus to prevent further belt pay out. Length adjusters of this type lock only in pay-out direction but not in winding direction. In the event, an occupant sits on a springy or compressible seat of a vehicle, any bumps in the road surface will thus compress the seat, causing the vehicle-sensitive length adjuster to pull in the belt webbing, while remaining locked as a result of vehicle shaking or vehicle accelerations, so that the belt webbing shortens across the occupant's body. This scenario repeats itself, causing the belt webbing to progressively tighten until becoming so taut that the occupant has to unbuckle.

It would therefore be desirable and advantageous to provide an improved safety belt to obviate prior art shortcomings and to enhance the comfort for the occupant.

SUMMARY OF THE INVENTION

According to one aspect of the present invention, a safety belt includes a length adjuster for securement of one end of a belt webbing, said length adjuster being constantly biased in a direction of retraction of the belt webbing, a locking mechanism constructed to inhibit the length adjuster from turning in a direction of protraction of the belt webbing, a control unit which normally applies a locking function to render the locking mechanism effective and thereby prevent a lengthening and shortening of the belt webbing, and an actuator operatively connected to the control unit and constructed to allow an occupant upon actuation to override the locking function and thereby render the locking mechanism ineffective to enable the occupant to adjust a length of the belt webbing.

The present invention resolves prior art problems by the provision of the control unit which is constructed such as to normally inhibit the belt member from being pulled out. In the normally locked position of the locking mechanism, also called pay-out barrier, the length adjuster prevents a length adjustment of the belt webbing, i.e. shortening or lengthening. In other words, the length adjuster is prevented from rotating in either of both directions. The occupant is however able to override the locking function and adjust the belt webbing to a comfortable length by making it tighter or looser. The locking function can then be reinstated either manually or automatically immediately or after a certain time period. In the ready position of the safety belt, the control unit causes the belt webbing to be fully retracted so that the seat is clear for an occupant. In other words, the belt takeup with the belt webbing is situated on one side of the seat and the buckle is situated on the other side of the seat.

When seated, the occupant activates the control unit to render the locking mechanism ineffective so that the occupant can pull out the belt webbing and insert the tongue into the buckle. The length of the belt webbing can hereby be best suited to the occupant's body for a comfortable fit, without requiring any complicated adjustments on the belt webbing. After being inserted in the buckle, the belt webbing is tightened by the length adjuster and the control unit is deactivated to render the locking mechanism effective.

Integrating the control unit in the locking mechanism allows automatic retraction of the belt webbing, when the safety belt is not in use. The seat is clear for the occupant to sit down. Activating the control unit renders the locking mechanism ineffective to enable the occupant to grab the tongue and pull out the belt webbing to guide it over the occupant's waist and ultimately insert the tongue in the buckle. The tension force acting on the belt webbing ensures a taut fit of the belt member across the occupant's waist, regardless of the occupant's size, and that the control unit renders the locking mechanism effective once the tongue of the belt webbing is inserted in the buckle.

A safety belt according to the present invention may be applicable as a simple lap belt but also for three-point harness or multi-point harness. It complies with SAE AS 8043 for torso restraint systems, requiring that the length adjuster should normally be locked against pay out at enough force on the belt webbing to keep the length adjuster locked. The safety belt is also applicable for vehicles with limited movement space for buckling up occupants in a vehicle seat. For example, restraint vests which remain worn can be connected with the belt webbing of the safety belt.

According to another advantageous feature of the present invention, the length adjuster has a spindle a spindle for securement of the one end of the belt webbing, and a stepper motor acting on the spindle to spontaneously tighten the belt webbing when the occupant releases the actuator. As an alternative to the stepper motor, the length adjuster may have a spring which maintains the spindle under tension to urge the length adjuster to tighten the belt webbing when the occupant releases the actuator.

According to another advantageous feature of the present invention, the control unit may include a cam disk, which is rotatable in opposition to a restoring force of a spring and has an arcuate slot, a locking pin received in the arcuate slot for movement between a first position in which the locking pin engages the locking mechanism to implement the locking function and a second position in which the locking pin is disengaged from the locking mechanism, and a cable pull connecting the actuator with the cam disk.

In the ready position, the belt webbing of the safety belt is fully retracted by the length adjuster and the locking mechanism is rendered effective. Activating the control unit causes a rotation of the cam disk in opposition to the recoiling force of the spring, resulting in the locking pins to radially move in the curved slots to render the locking mechanism ineffective.

The belt webbing can be pulled out so long as the locking pins of the cam disk are disengaged from the locking mechanism. When deactivating the control unit, the spring returns the cam disk to its initial position and the locking pins engage the locking mechanism to render it effective and inhibit a lengthening of the belt webbing.

According to another advantageous feature of the present invention, the actuator may include a release button provided in an armrest of a vehicle seat. The control unit is thus activated as long as the release button is pressed in order to render the locking mechanism ineffective and allow the occupant to buckle up. When the occupant lets go of the release button, the control unit returns to its normal position in which the locking mechanism is rendered effective and further protraction of the belt webbing is inhibited. However, while being buckled up, the occupant has the option to still adjust the length of the belt webbing by simply pressing and holding the release button to render the locking mechanism ineffective.

According to another advantageous feature of the present invention, the control unit may include a magnetic switch, which is activated when the occupant actuates the actuator to override the locking function and thus render the locking mechanism ineffective. Thus, the occupant can buckle up or adjust the length of the belt webbing. The magnetic switch may be provided with a timer to define a time period within which the occupant is able to override the locking function. In other words, when actuating the release button, the occupant is able to buckle up or adjust the length of the belt webbing within a predefined time period. Once the time period has elapsed, the control unit is activated and the locking mechanism is immediately rendered effective again. Using such a time window eliminates the need to press and hold the actuator for a lengthy period, while adjusting the safety belt.

According to another advantageous feature of the present invention, the control unit may be deactivated by a master signal triggered by a vehicle sensor or distance sensor or manually, to temporarily override the locking function and to allow a shortening and thereby tightening of the belt webbing. Suitably, the master signal, which can be triggered by the pilot of an aircraft for example, can be used to influence in unison all individual seats in the aircraft. In other words, a central master signal can be used to deactivate the control units of all seats to retract the belt webbings and clear the seats for subsequent occupancy by passengers. Once seated, the passengers are able to individually control the safety belt in their seats by pressing the release button. Advantageously, each control unit is deactivated again within a predefined time period after the master signal has been triggered to implement the locking function.

According to another advantageous feature of the present invention, a detector may be operatively connected to the control unit to cause the control unit to implement the locking function when the detector ascertains that the occupant occupies a vehicle seat, and to cause an overriding of the locking function, when the vehicle seat is vacated so that the length adjuster is able to retract excess belt webbing. In other words, when the seat is vacant, any slack in the belt webbing is eliminated by retracting the belt webbing. Advantageously, the control unit is deactivated within a predefined time period after the detector has recognized that the vehicle seat is occupied to render the locking mechanism effective. Suitably, the detector may be implemented as a pressure sensor which is integrated in a seating area of the vehicle seat.

According to another advantageous feature of the present invention, the buckle for receiving belt webbing may be provided with a switching device fitted in the buckle and constructed to cause the control unit to implement the locking function when the belt webbing is engaged in the buckle and to cause an overriding of the locking function, when the belt webbing is disengaged from the buckle so that the length adjuster is able to retract excess belt webbing. The locking mechanism is normally rendered effective so long as the tongue is inserted in the buckle, unless the occupant presses the release button or actuates an opening button on the buckle to release the belt webbing.

According to another advantageous feature of the present invention, the belt webbing may have conductors interlaced therein and operatively connected to contacts of the length adjuster and the buckle latch so that the control unit implements the locking function, when the switching device recognizes that the belt webbing is engaged in the buckle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
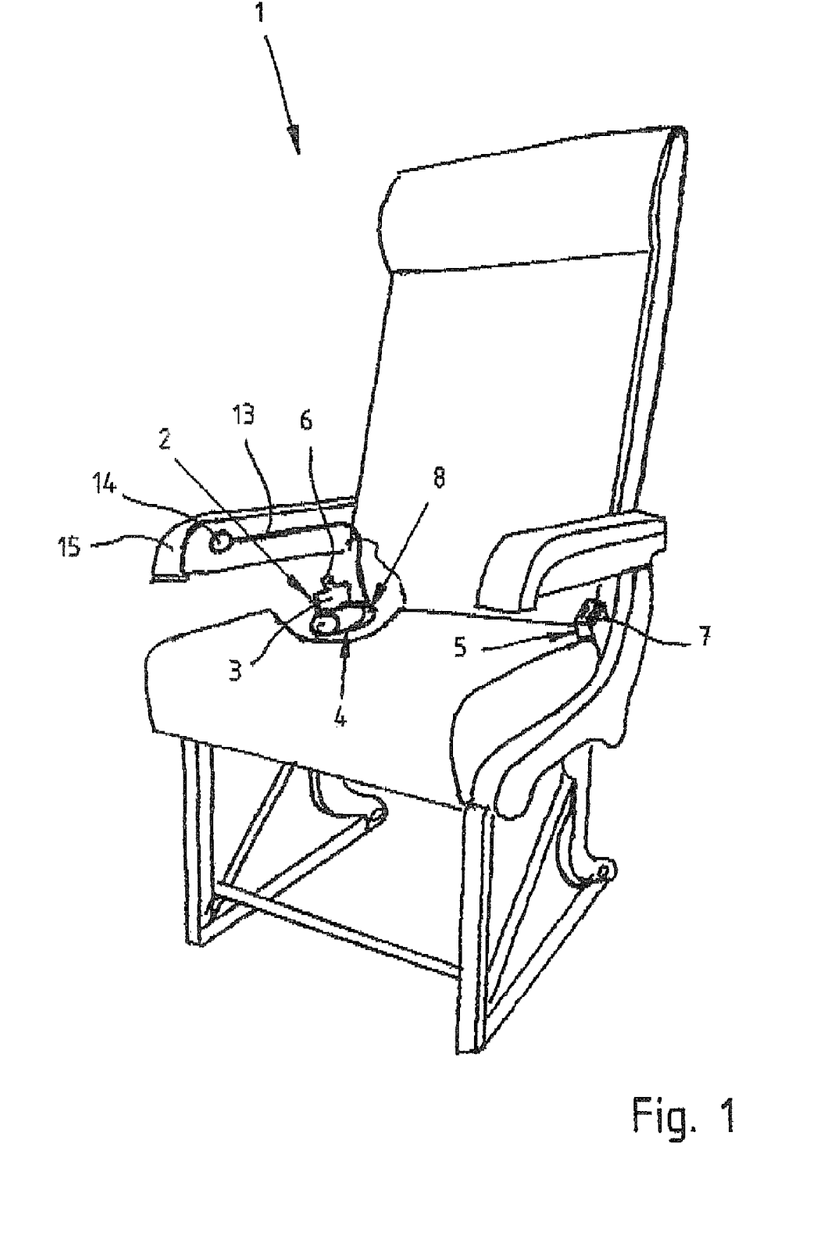
FIG. 1 is a perspective view of a seat for exemplary use in an aircraft, partially broken open and having embodied therein a safety belt according to the present invention.

Turning now to the drawing, and in particular to FIG. 1, there is shown a perspective view of a seat, generally designated by reference numeral 1, for exemplary use in an aircraft, partially broken open and having embodied therein a safety belt according to the present invention, generally designated by reference numeral 2. The safety belt 2 is configured in the form of a lap belt having a belt webbing 3. In the illustration of FIG. 1, the belt webbing 3 is completely pulled into a belt takeup 4 which is arranged on one side of the seat 1. A lock or buckle 5 of the safety belt 2 is positioned on the other side of the seat 1 for receiving a tongue 6 on one end of the belt webbing 3 and includes an opening button 7 which when pressed by an occupant frees the belt webbing 3 from the buckle 5.

The belt takeup 4 houses a rotating length adjuster having a spindle 18 (FIG. 3) which is constantly biased in the direction of retraction of a belt by a spring or stepper motor and to which the other end of the belt webbing 3 is connected. The length adjuster incorporates a locking mechanism which, when rendered effective, is able to lock the spindle 18 so that the belt webbing 3 cannot be pulled out from the length adjuster in the event of turbulences for example, or when a sudden decelerating situation is sensed. The locking mechanism may include a ratchet wheel mounted on the spindle of the length adjuster and ratchet pawls engageable with the teeth of the ratchet wheel.

Figure 3:
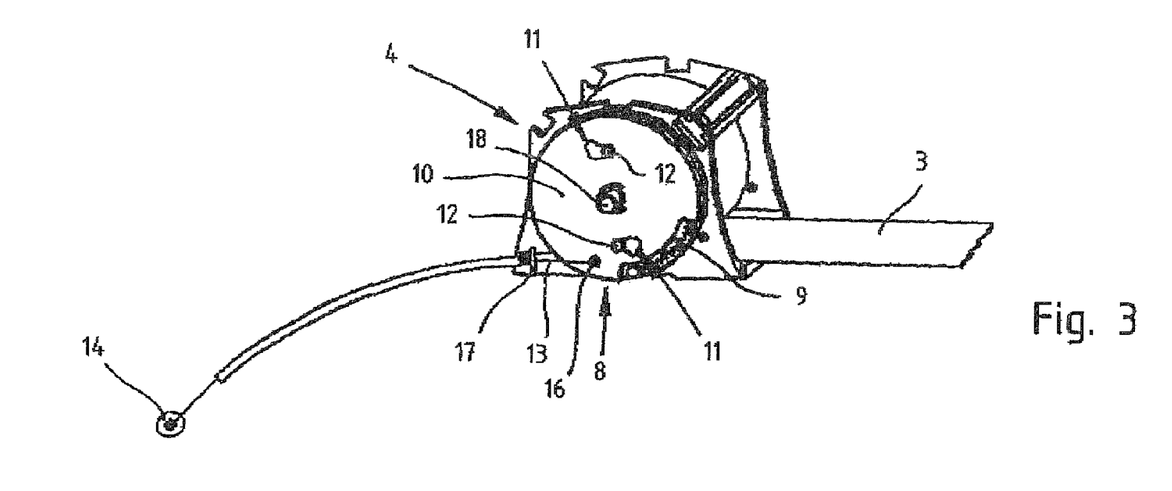
FIG. 3 is a schematic perspective illustration, on an enlarged scale, of a belt takeup with a control unit in normal or deactivated position.

As shown in FIG. 3, the belt takeup 4 further includes a control unit 8 which is disposed at one end surface of the belt takeup 4 and includes a cam disk 10 which is mounted on the spindle 18 and rotatable in opposition to a recoiling force of a spring 9. The cam disk 10 is formed with two arcuate slots 11 disposed in 180° offset relationship and traversed by locking pins 12 which form part of the locking mechanism. A cable pull 13, suitably integrated in the armrest 15 (FIG. 1) of the seat 1, is enveloped within a protective sheathing and connects the cam disk 10 to an actuator, such as release button 14 or also lever or turning knob or other suitable configuration, placed in the armrest 15. The cable pull 13 extends from a stop 16 on the cam disk 10 to the release button 14 via an abutment 17 which is required for actuation of the cable pull 13.

FIG. 3 shows the locking mechanism in the effective position. The belt webbing 3 is fully retracted by the length adjuster into the belt takeup 4 and the locking mechanism inhibits the belt webbing 3 from being pulled out of the belt takeup 4. The spring 9 of the control unit 8 has turned the cam disk 10 to a position in which the locking pins 12 have shifted in the slots 11 radially in the direction of the spindle 18 so that the locking mechanism is rendered effective, i.e. the control unit 8 is deactivated and implements the locking function.

Figure 4:
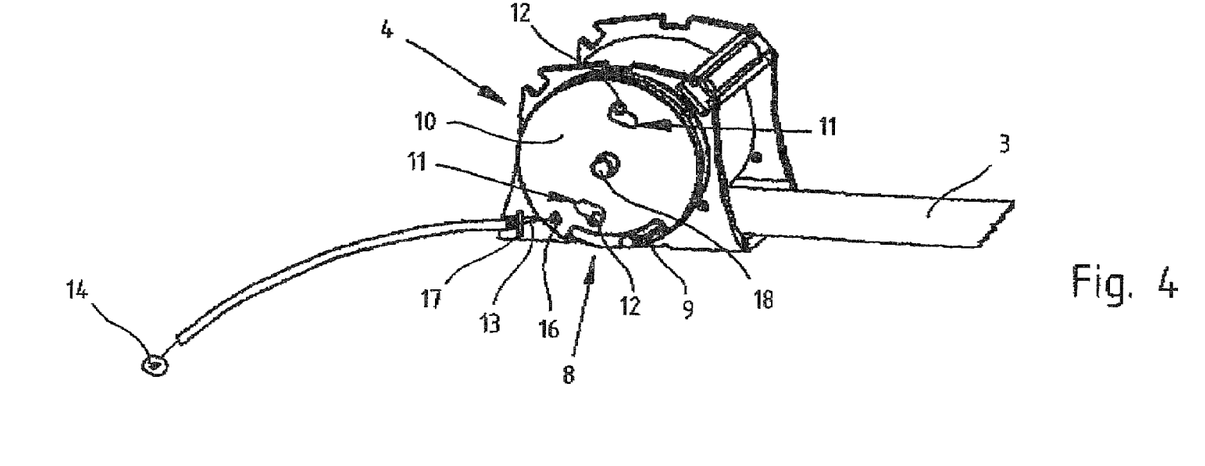
FIG. 4 is a schematic perspective illustration, on an enlarged scale, of the belt takeup of FIG. 3 with the control unit in activated position.

Actuating the release button 14 on the armrest 15 causes the cam disk 10 to rotate in a direction and thereby compresses the spring 9, as shown in FIG. 4. As a result, the locking pins 12 are moved in the slots 11 radially outwards to a position which is further distanced from the spindle 18. As a result, the locking mechanism is rendered ineffective and the occupant is able to pull the belt webbing 3 in opposition to the recoiling force of the length adjuster out of the belt takeup 4.

When buckled up, i.e. the tongue 6 of the belt webbing 3 is inserted into the buckle 5 and locked by a buckle latch (not shown), the occupant lets go of the release button 14 so that the spring 9 urges the cam disk 10 to return to the position shown in FIG. 3 and the locking pins 12 move into position to render the locking mechanism effective and thus to inhibit a protraction of the belt webbing. The occupant, however, is able to pull the belt webbing 3 tightly across the occupant's body. Thus, the belt webbing 3 can be pulled out of the belt takeup 4 only when the occupant presses the release button 14 and holds it long enough to allow the occupant to slack the belt webbing 3 for a comfortable seating position. When intending to get up, the occupant actuates the opening button 7 on the buckle 5 to allow the length adjuster to fully retract the belt webbing 3 into the belt takeup 4.

Figure 2:
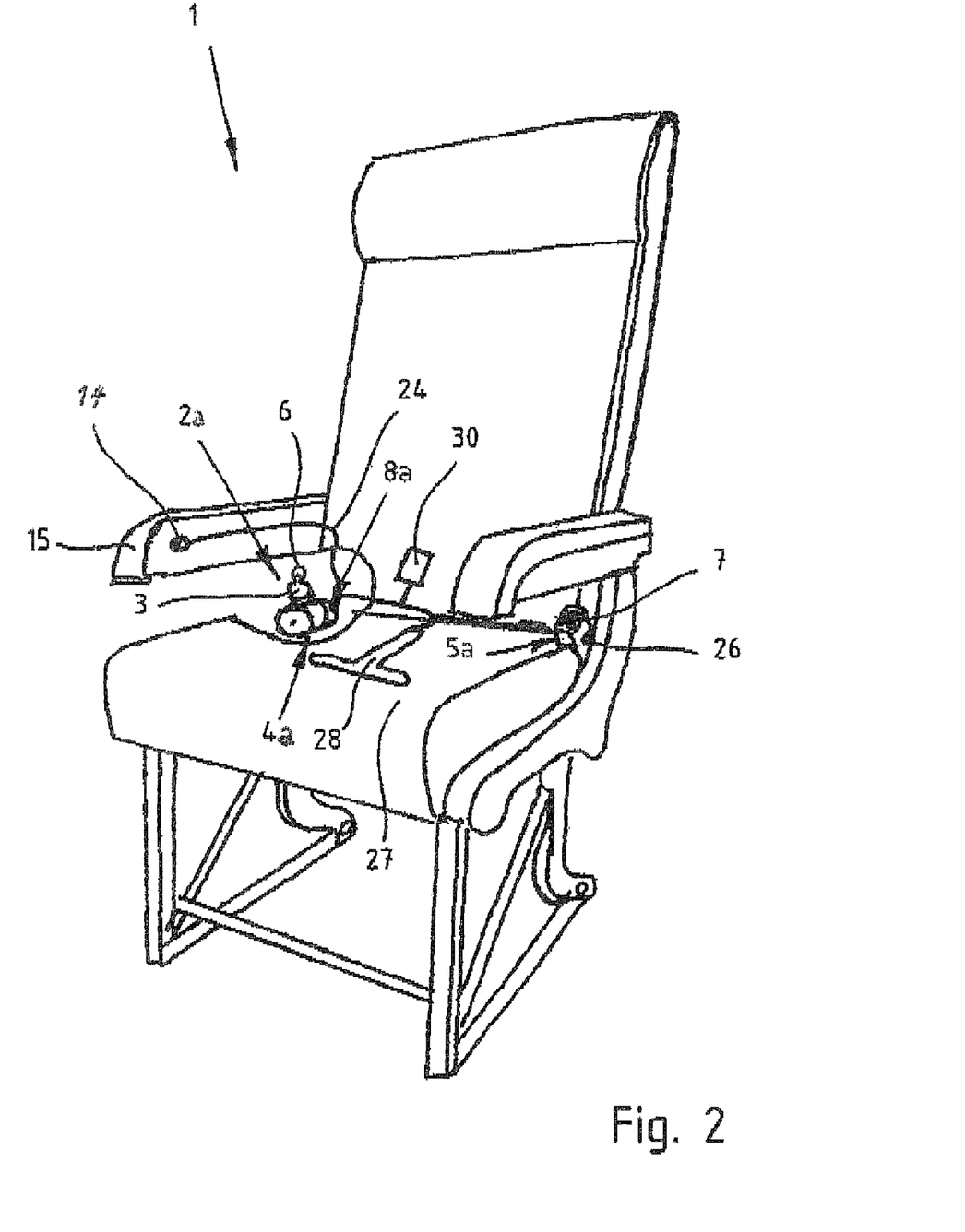
FIG. 2 is a perspective view of a seat for exemplary use in an aircraft, partially broken open and having embodied therein a modification of a safety belt according to the present invention.

Referring now to FIG. 2, there is shown a perspective view of a seat for exemplary use in an aircraft, partially broken open and having embodied therein a modification of a safety belt according to the present invention, generally designated by reference numeral 2a. Parts corresponding with those in FIG. 1 are denoted by identical reference numerals and not explained again. The description below will center on the differences between the embodiments. In this embodiment, provision is made for a safety belt 1a equipped with electrical components, shown in greater detail in FIGS. 4a, 4b; 5a, 5b; 6a, 6b. The safety belt 2a includes a control unit 8a which has a cam disk 22 with locking pins 12 for interaction with a locking mechanism for a length adjuster in the belt takeup 4. The cam disk 22 can move in coaxial relationship to an axis 20 of the belt takeup 4 in opposition to a force applied by a stepper motor 19, as shown in FIGS. 4a, 4b, or in opposition to a recoiling force applied by springs 29 through actuation of a magnetic switch 21, as shown in FIGS. 5a, 5b; 6a, 6b.

Figure 4A:
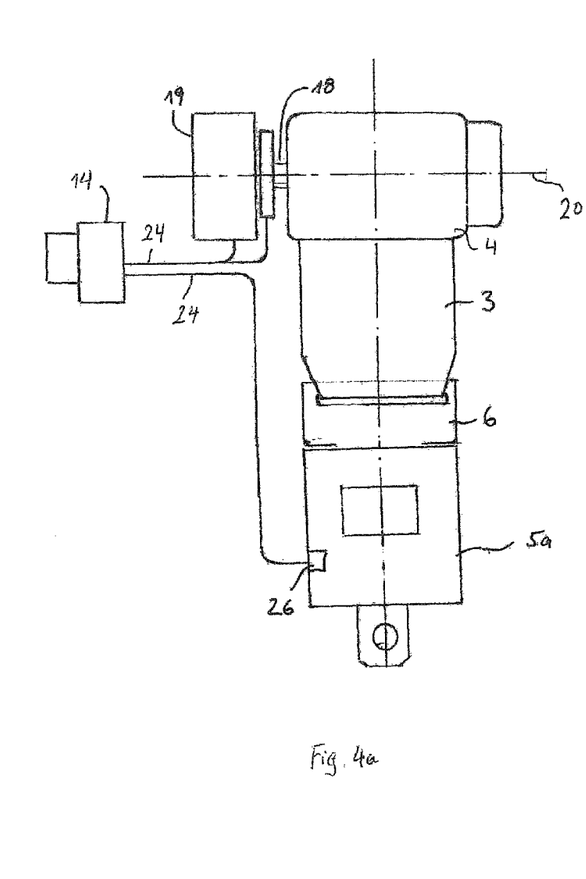
FIGS. 4a, 4b are schematic plan views of a belt takeup with another embodiment of a control unit in locked and unlocked positions, respectively.
Figure 4B:
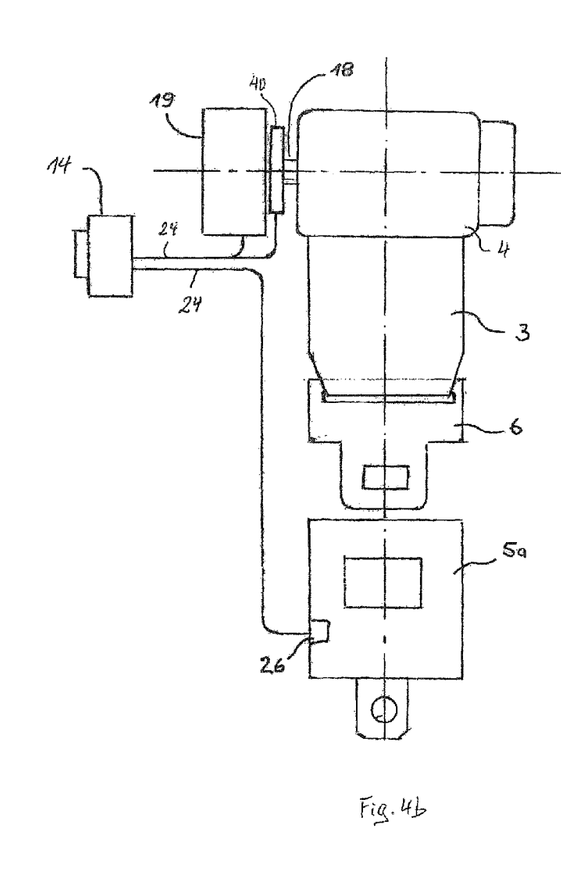
Figure 5A:
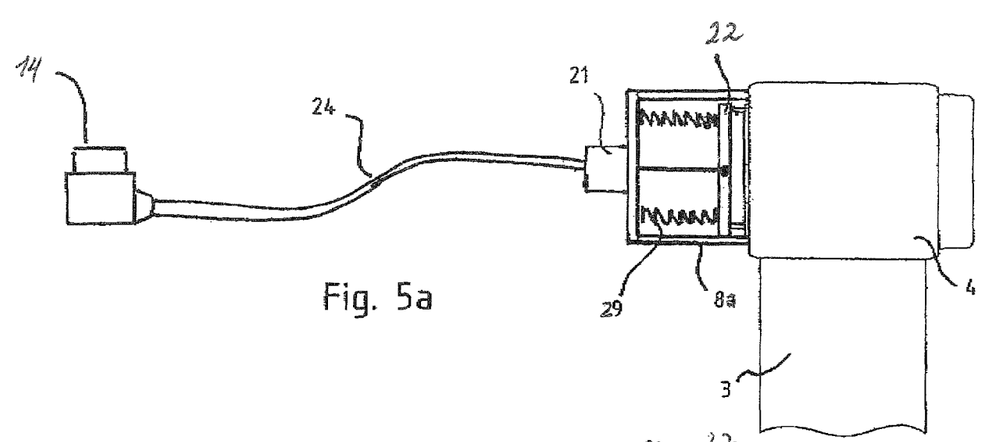
FIGS. 5a, 5b are schematic plan views of a belt takeup with yet another embodiment of a control unit in locked and unlocked positions, respectively.
Figure 5B:
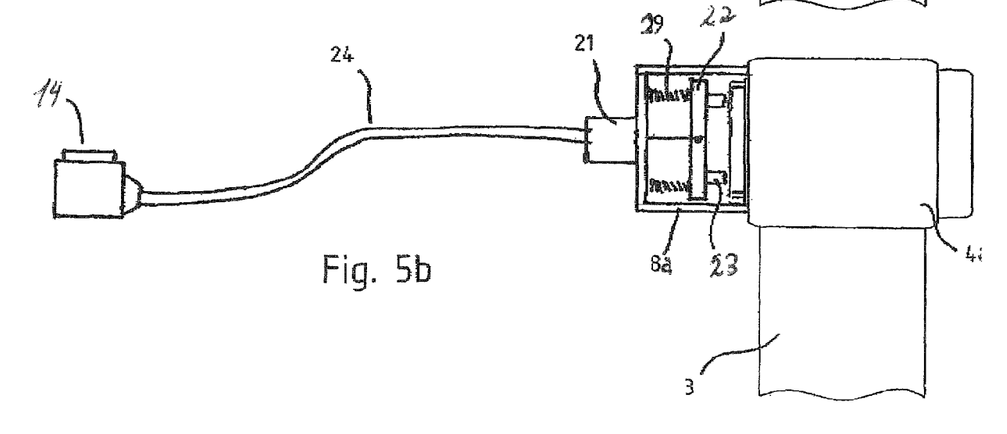

As shown in FIGS. 4a, 4b, the safety belt 2a has a buckle 5 which is provided with a buckle switch 26. The buckle switch 26 is operatively connected via a cable 24 to the release button 14 and ascertains the situation when the tongue 6 of the belt webbing 3 has been inserted in the buckle 5. The seat 1 has a seating area 27 having integrated therein a pressure sensor 28 which is operatively connected to the control unit 8a and detects whether an occupant occupies the seat 1. The provision of the pressure sensor 28 may be combined with the operation of the buckle switch 26 to trigger a warning signal, when the seat 1 is occupied but the occupant has not buckled up. The warning signal may hereby be indicated in a display continuously or intermittently.

As shown schematically in FIGS. 4a, 4b, the stepper motor 19 of the length adjuster is operatively connected to the spindle 18 via an electromagnetically disengageable coupling 40. To override the engagement of the coupling 40 with the spindle 18, the coupling 40 has a flip-flop circuit. Thus, when, for example, the belt webbing 3 is detached from the buckle 5, as shown in FIG. 4a, the spindle 18 of the length adjuster is released to allow the stepper motor 19 to retract the belt webbing 3 onto the spindle 18 by a predefined tensile force. The tensile force can be hereby be monitored by a sensor. When the tensile force is exceeded, for example when an occupant wishes to buckle up, the stepper motor 19 is shutdown and the coupling 40 is disengaged, allowing the occupant to pull out the belt webbing 3 and insert the tongue 6 into the buckle 5. When buckled up, as shown in FIG. 4b, a signal is generated, causing activation of the stepper motor 19 to pull in enough slack until a predefined belt tension is reached. The stepper motor 19 is at rest, the coupling 40 is engaged, and the spindle 18 is locked, inhibiting an extension of the belt webbing 3. Pressing the release button 14, e.g. a multiway switch, allows the occupant to deactivate the control unit 8a and thus to unlock the spindle 18 so that the stepper motor 19 can now move backwards or forwards to tighten or loosen the belt webbing 3 and thus to adjust the length of the belt webbing 3. When letting go of the release button 14, the stepper motor 19 comes to a standstill and the spindle 18 of the length adjuster is locked again. The safety belt 2a assumes a new setting which is retained until the occupant wishes to change the setting by actuating the release button 14 or by unbuckling the belt webbing 3. In the event the safety belt is not in use, the stepper motor 19 is able to retract the belt webbing 3 and to roll it up on the spindle up to a predefined belt tension.

The stepper motor 19 may also be operated from a vehicle operator or aircraft pilot who can send a signal to effect a tightening of the safety belt 2a.

In the embodiment of control unit 8a according to FIGS. 5a, 5b, cable 24 extends from the magnetic switch 21 to the release button 14 on the armrest 15 of seat 1. Parts corresponding with those in FIGS. 4a, 4b are denoted by identical reference numerals and not explained again. The description below will center on the differences between the embodiments. In this embodiment, the release button 14 is connected via cable 24 to the magnetic switch 21. The magnetic switch 21 can advantageously be equipped with a timer (not shown) to open a time window to allow implementation of certain actions, as will be described furtherbelow. The control device 8a has a cam disk 22 which is biased by springs 29 and has a spring-distal surface provided with projecting locking pins 23 for interaction with the locking mechanism.

When the occupant actuates the release button 14 on the armrest 15, the locking pins 12 are moved from their position shown in FIG. 5a into the position shown in FIG. 5b and thus become disengaged to deactivate the locking mechanism. This opens a time window within which the occupant is able to pull the belt webbing 3 out of the belt takeup 4a and to insert the tongue 6 in the buckle 5. Once the time window closes, the locking mechanism is spontaneously activated again under the influence of the springs 29 and thus rendered effective by the engagement of the locking pins 23 in the locking mechanism. This situation is shown in FIGS. 4a, 5a.

When the tongue 6 has been inserted in the buckle 5, the buckle switch 26 in the buckle 5 sends a signal to a controller 30 (FIG. 7) to allow the length adjuster to tighten the belt webbing 3. The locking mechanism is rendered effective as the locking pins 23 are moved axially to engage the locking mechanism. A slacking of the belt webbing 3 may be realized by the occupant through actuation of the release button 14 in the armrest 15. When actuated, a time window opens within which the occupant is able to further pull the belt webbing 3 out of the belt takeup 4 as the control unit 8a is activated. Once the time window closes, the control unit 8a returns spontaneously under the force applied by the springs 29 to its normally deactivated position to execute the locking function.

The safety belt 1a can be unbuckled by actuating the opening button 7 on the buckle 5. Again, this opens a time window within which the belt webbing 3 can be fully retracted into the belt takeup 4a.

Figure 6A:
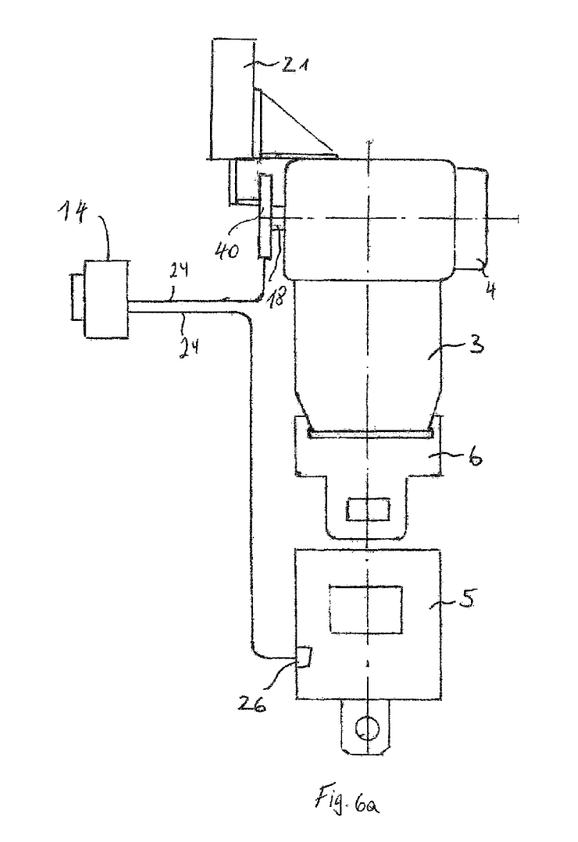
FIGS. 6a, 6b are schematic plan views of a belt takeup with still another embodiment of a control unit in locked and unlocked positions
Figure 6B:
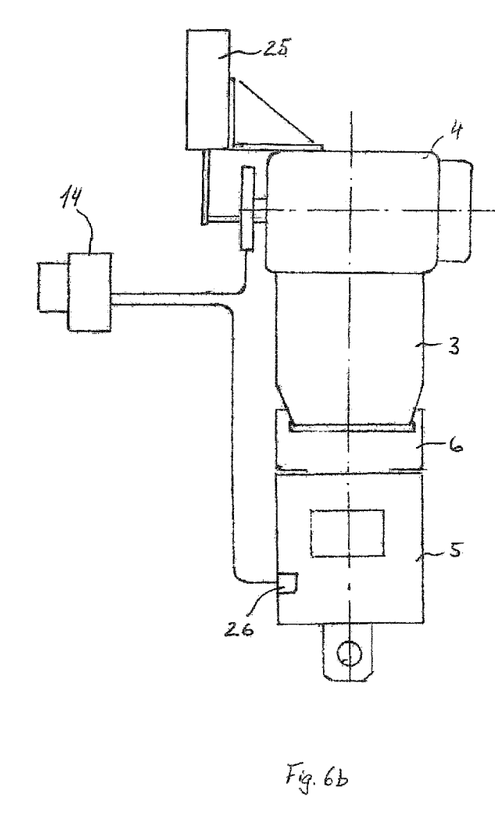

Turning now to FIGS. 6a, 6b, there is shown yet another variation of a control unit 8a. Parts corresponding with those in FIGS. 4a, 4b are denoted by identical reference numerals and not explained again. The description below will center on the differences between the embodiments. In this embodiment, provision is made for a solenoid 25, instead of a stepper motor, to engage or disengage the coupling 40 in relation to the spindle 18. The mode of operation is similar as described with respect to FIGS. 4a, 4b.

Figure 7:
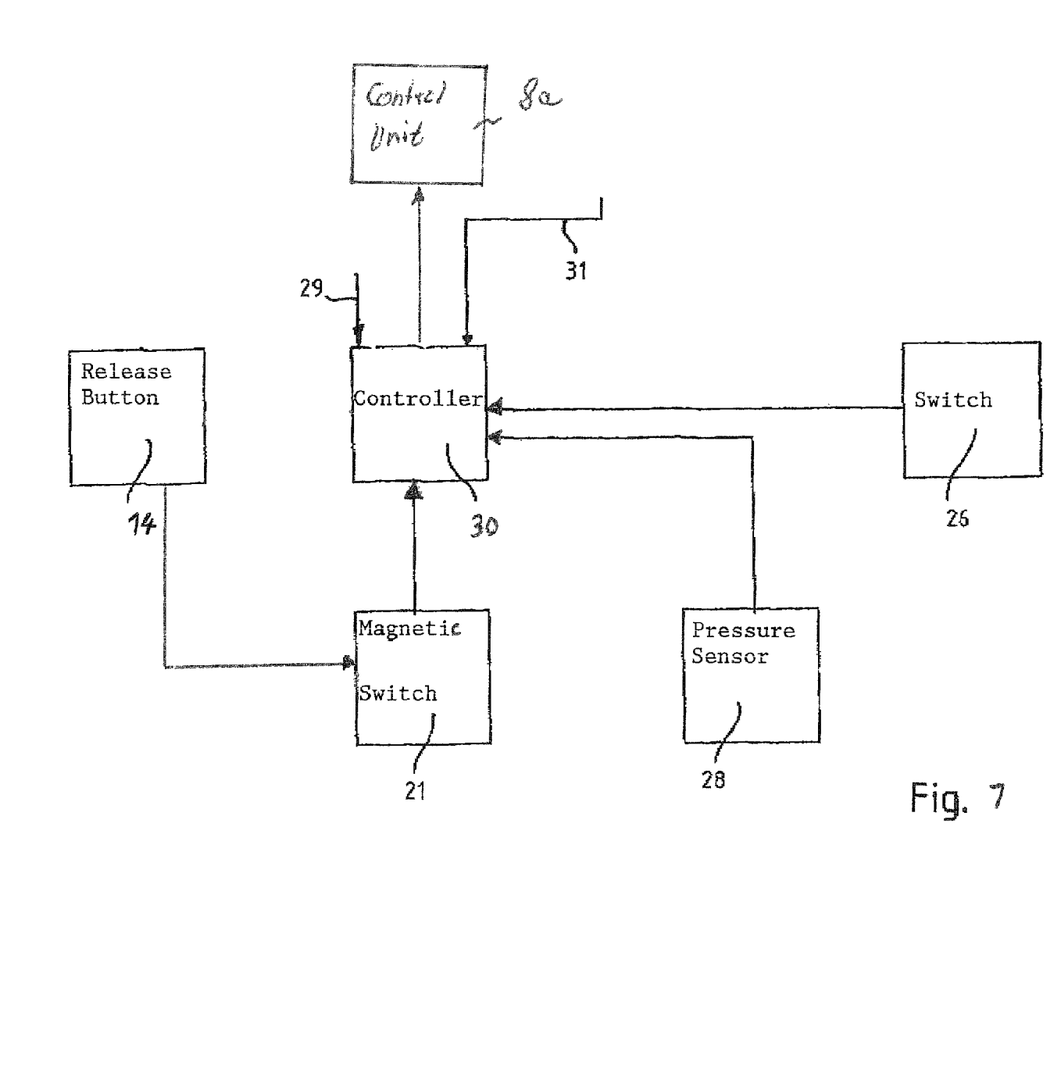
FIG. 7 is a block diagram showing the relationship and operation of the components of the control unit of FIG. 2.

FIG. 7 shows a block diagram showing the relationship between various components of the safety belt according to the present invention. As can be seen, the signals generated by the pressure sensor 28 in the seating area 27, the buckle switch 26 on the buckle 5, and the magnetic switch 21 (or solenoid 25) are all operatively connected to the controller 30 which is supplied with power from a power source 29. A line 31 connects the seat 1 with further seats in the aircraft and the assembly of seats 1 to the cockpit from which a central master signal can be triggered to a primary control unit so that the belt webbings 3 of all seats 1 can be pulled in unison into their belt takeups. The timer in the respective magnetic switches 21 renders the locking mechanism effective again within a certain time window.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A safety belt, comprising:
    a retractor for securement of one end of a belt webbing, said retractor being constantly biased in a direction of retraction of the belt webbing;
    a control unit which, when activated, applies a locking function to inhibit the belt member from being pulled out of the retractor and being retracted, thereby preventing a lengthening and shortening of the belt webbing; and
    an actuator operatively connected to the controller and constructed to allow an occupant upon actuation to override the locking function and to enable the occupant to adjust a length of the belt webbing.

2. The safety belt of claim 1, wherein the length adjuster has a spindle for securement of the one end of the belt webbing, and a stepper motor acting on the spindle to spontaneously tighten the belt webbing when the occupant releases the actuator.

3. The safety belt of claim 1, wherein the length adjuster has a spindle for securement of the one end of the belt webbing, and a spring acting on the spindle to urge the length adjuster to tighten the belt webbing when the occupant releases the actuator.

4. The safety belt of claim 1, further comprising a locking mechanism constructed to inhibit the length adjuster from turning in a direction of protraction of the belt webbing, wherein the control unit includes a cam disk, which is rotatable in opposition to a restoring force of a spring and has an arcuate slot, a locking pin received in the arcuate slot for movement between a first position in which the locking pin engages the locking mechanism to implement the locking function and a second position in which the locking pin is disengaged from the locking mechanism, and a cable pull connecting the actuator with the cam disk.

5. The safety belt of claim 1, wherein the actuator includes a release button provided in an armrest of a vehicle seat.

6. The safety belt of claim 1, wherein the control unit includes a magnetic switch which is activated when the occupant actuates the actuator to override the locking function.

7. The safety belt of claim 6, wherein the magnetic switch includes a timer to define a time period within which the occupant is able to override the locking function.

8. The safety belt of claim 1, wherein the control unit is deactivated by a master signal triggered by a vehicle sensor or distance sensor or manually, to override the locking function and to allow a shortening and thereby tightening of the belt webbing.

9. The safety belt of claim 8, wherein the control unit is activated again within a predefined time period to implement the locking function after the master signal has been triggered.

10. The safety belt of claim 1, further comprising a detector operatively connected to the control unit to cause the control unit to implement the locking function when the detector ascertains that the occupant occupies a vehicle seat, and to cause an overriding of the locking function, when the vehicle seat is vacated so that the length adjuster is able to retract excess belt webbing.

11. The safety belt of claim 10, wherein the control unit applies the locking function within a predefined time period after the detector has recognized that the vehicle seat is occupied.

12. The safety belt of claim 10, wherein the detector is a pressure sensor which is integrated in a seating area of the vehicle seat.

13. The safety belt of claim 1, further comprising a buckle for receiving another end of the belt webbing, and a switching device fitted in the buckle and constructed to cause the control unit to implement the locking function when the belt webbing is engaged in the buckle and to cause an overriding of the locking function, when the belt webbing is disengaged from the buckle so that the length adjuster is able to retract excess belt webbing.

14. The safety belt of claim 13, wherein the belt webbing has conductors interlaced therein and operatively connected to contacts of the length adjuster so that the control unit implements the locking function, when the switching device recognizes that the belt webbing is engaged in the buckle.

15. The safety belt of claim 1, wherein the length adjuster is incorporated as flying adjustment in the belt webbing.

\* \* \* \* \*